(12) United States Patent
Sugimoto et al.

(10) Patent No.: US 6,292,753 B1
(45) Date of Patent: Sep. 18, 2001

(54) BRAKING CONTROL SYSTEM FOR VEHICLE

(75) Inventors: Yoichi Sugimoto; Shoji Ichikawa; Yoshihiro Urai; Satoshi Hada, all of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/380,626
(22) PCT Filed: Oct. 15, 1998
(86) PCT No.: PCT/JP98/04669
§ 371 Date: Sep. 17, 1999
§ 102(e) Date: Sep. 17, 1999
(87) PCT Pub. No.: WO99/42347
PCT Pub. Date: Aug. 26, 1999

(30) Foreign Application Priority Data

Feb. 18, 1998 (JP) .................................................. 10-035662

(51) Int. Cl.$^7$ ................................. G01S 13/93; B60T 8/00
(52) U.S. Cl. ............................... 701/301; 701/96; 701/78; 340/435
(58) Field of Search ............................. 701/301, 96, 78; 340/903, 435, 436; 303/125

(56) References Cited

U.S. PATENT DOCUMENTS

| | | | | |
|---|---|---|---|---|
| 5,166,881 | * | 11/1992 | Akasu | 701/93 |
| 5,410,484 | * | 4/1995 | Kunimi et al. | 701/70 |
| 5,447,363 | * | 9/1995 | Fukamachi | 303/125 |
| 5,805,103 | * | 9/1998 | Doi et al. | 342/70 |
| 5,835,008 | * | 11/1998 | Colemere | 340/439 |
| 6,044,321 | * | 3/2000 | Nakamura et al. | 701/96 |

FOREIGN PATENT DOCUMENTS

| | | |
|---|---|---|
| 4-121260 | 4/1992 | (JP) . |
| 5-39011 | 2/1993 | (JP) . |
| 5-286427 | 11/1993 | (JP) . |
| 6-298022 | 10/1994 | (JP) . |
| 7-315187 | 5/1995 | (JP) . |
| 8-34326 | 2/1996 | (JP) . |
| 8-310359 | 11/1996 | (JP) . |
| 10-315938 | 12/1998 | (JP) . |

* cited by examiner

Primary Examiner—Tan Nguyen
(74) Attorney, Agent, or Firm—Arent Fox Kintner Plotkin & Kahn, PLLC

(57) ABSTRACT

When a radar device $S_1$ detects an object existing ahead of a vehicle in the movement direction of the vehicle, a determining device M1 determines a possibility of contact of the vehicle with the object from the relative positional relationship between the vehicle and the object, based on the result of such detection. If it is determined there is the possibility of contact, an automatic braking device M2 operates a vacuum booster 2 to carry out an automatic braking operation to avoid the contact of the vehicle with the object. When a braking-will detecting device M3 detects a driver's braking will during the automatic braking operation by the automatic braking device M2, an emergency-degree presuming device M4 presumes a degree of emergency in the driver's braking will, and the automatic braking device M2 generates the braking force corresponding to the degree of emergency to assist in the braking operation of the driver. This enables a smooth switch-over from the avoidance of the contact by the automatic braking operation to the avoidance of the contact by the driver's braking operation, and a high braking force assisted by the automatic braking operation can be generated to effectively avoid the contact.

9 Claims, 6 Drawing Sheets

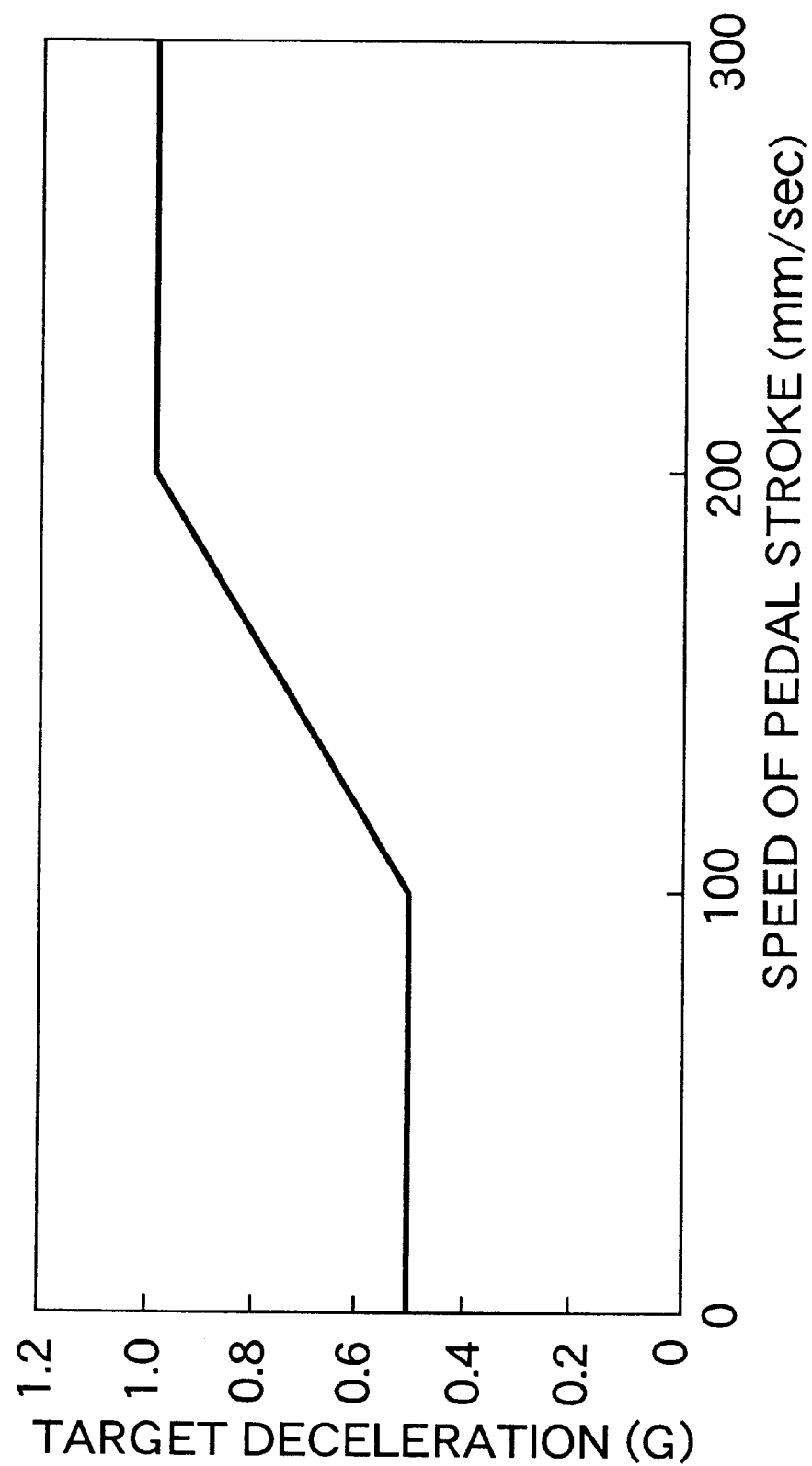

BRAKING CONTROL SYSTEM FOR VEHICLE

FIELD OF THE INVENTION

The present invention relates to a braking control system for a vehicle, in which a braking device is automatically operated, based on a relative positional relationship between the vehicle and an object detected by an object detecting device such as a laser radar to thereby avoid contact of the vehicle with the object.

BACKGROUND ART

Such a braking control system for a vehicle is already known, for example, in Japanese Patent Application Laid-open No. 6-298022. This braking control system is designed so that when the contact of the vehicle with the object can be avoided only by the steering operation, the avoidance of the contact is performed by the steering operation without carrying out an automatic braking operation, and in the case of emergency where the contact of the vehicle with the object cannot be avoided by only the steering operation, the automatic braking operation is carried out to enable the avoidance of the contact.

The automatic braking operation is effective for avoiding the contact of the vehicle with the object. However, at present, it is technically difficult to avoid the contact of the vehicle with the object in a perfect automatic braking operation due to the limits of the accuracy of detection of an object detecting means such as a laser radar. Therefore, desirably, it is premised that a driver basically carries out the braking operation of his or her own will and, in case the driver conducts an erroneous operation, the braking operation is assisted by the automatic braking operation. For this purpose, it is required that, respecting the braking operation carried out by the driver, the automatic braking operation be carried out so as not to interfere with such driver's braking operation, thereby to effectively achieve the avoidance of the contact.

The present invention has been accomplished with the above circumstances in view, and it is an object of the present invention to effectively avoid the contact of the vehicle with an object, while preventing the automatic braking operation from interfering with the braking provided by the braking operation carried out by the driver.

DISCLOSURE OF THE INVENTION

To achieve the above object, according to the present invention, there is provided a braking control system for a vehicle, comprising an object detecting device for detecting an object existing ahead of the vehicle in the direction of movement of the vehicle, a braking device for braking the vehicle, a determining means for determining the possibility of a contact of the vehicle with the object from the relative positional relationship between the vehicle and the object, based on the result of the detection conducted by the object detecting device, and an automatic braking means for operating the braking device based on the result of the determination conducted by the determining means to carry out an automatic braking operation, characterized in that the braking control system further includes a braking-will detecting means for detecting a driver's braking will, so that the automatic braking means assists in the braking operation conducted by the driver, when the driver's braking will is detected by the braking-will detecting means during the automatic braking operation conduced by the automatic braking means.

With the above arrangement, when the object detecting device detects an object existing ahead of the vehicle in the direction of movement of the vehicle, the determining means determines the possibility of contact of the vehicle with the object from the relative positional relationship between the vehicle and the object, based on the result of the detection. When it is determined that there is the possibility of contact, the automatic braking means operates the braking device to carry out the automatic braking operation in order to avoid the contact of the vehicle with the object. When the driver's braking will is detected by the braking-will detecting means during the automatic braking operation conducted by the automatic braking means, the automatic braking means assists in the braking operation of the driver. Therefore, the avoidance of the contact by the automatic braking operation is smoothly switched over to the avoidance of the contact by the braking operation based on the driver's will, and a high braking force assisted by the automatic braking operation is generated to effectively enable the avoidance of the contact.

In addition to the above arrangement, there is provided a braking control system for a vehicle, characterized in that the braking-will detecting means detects the driver's braking will, based on at least one of the operation of depressing a brake pedal by the driver, the operation of returning an accelerator pedal by the driver and the movement of a foot of the driver toward the brake pedal.

With the above arrangement, the driver's braking will can be detected easily and reliably, based on the operation of depressing the brake pedal by the driver, the operation of returning the accelerator pedal by the driver, or the movement of the driver's foot toward the brake pedal.

In addition to the above arrangement, there is provided a braking control system for a vehicle, characterized in that the braking control system further includes a warning device for outputting a warning to the driver prior to the start of the automatic braking operation provided by the automatic braking means, and the braking-will detecting means detects the driver's braking will, based on at least one of the operation of depressing the brake pedal by the driver, the operation of returning the accelerator pedal by the driver and the movement of the driver's foot toward the brake pedal, within a predetermined period of time after output of the warning by the warning device.

With the above arrangement, the warning device is operated before starting of the automatic braking operation by the automatic braking means to output the warning to the driver, and the driver's braking will is detected with such a timing that the driver's reaction to the warning is expected. Therefore, the braking will can be detected with further high accuracy.

The predetermined period of time is set at two seconds in an embodiment, but the value is a matter of design choice that can be set as desired.

In addition to the above arrangement, there is provided a braking control system for a vehicle, characterized in that the assisting in the braking operation of the driver by the automatic braking means is to maintain the braking force in the automatic braking operation before detection of the driver's braking will, or to increase the braking force in the automatic braking operation.

With the above arrangement, the braking operation of the driver is assisted by maintaining or increasing the braking force in the automatic braking operation. Therefore, the braking operation of the driver can be assisted effectively to enable the avoidance of the contact effectively by the braking operation.

In addition to the above arrangement, there is provided a braking control system for a vehicle, characterized in that the assisting in the braking operation of the driver by the automatic braking means is to generate a braking force exceeding the braking force corresponding to the braking operation of the driver.

With the above arrangement, a braking force exceeding the braking force corresponding to the braking operation of the driver is generated by the automatic braking operation. Therefore, the braking operation of the driver can be assisted effectively to enable the avoidance of the contact effectively by the braking operation.

In addition to the above arrangement, there is provided a braking control system for a vehicle, characterized in that the braking control system further includes an emergency-degree presuming means for presuming the degree of emergency in the driver's braking will, and as the degree of emergency presumed by the emergency-degree presuming means is higher, the automatic braking means increases the braking force in the automatic braking operation.

With the above arrangement, as the degree of emergency presumed by the emergency-degree presuming means is higher, the braking force in the automatic braking operation is increased. Therefore, in such an emergency that it is difficult to avoid the contact of the vehicle with the object, the high braking force can be generated to effectively enable the avoidance of the contact.

In addition to the above arrangement, there is provided a braking control system for a vehicle, characterized in that the emergency-degree presuming means presumes the degree of emergency in the driver's braking will, based on at least one of the speed of the operation of depressing the brake pedal by the driver, the speed of the operation of returning the accelerator pedal by the driver and the speed of the movement of the driver's foot toward the brake pedal.

With the above arrangement, the degree of emergency in the driver's braking will can be presumed easily and reliably, based on the speed of the operation of depressing the brake pedal by the driver, the speed of the operation of returning the accelerator pedal by the driver, or the speed of the movement of the driver's foot toward the brake pedal.

In addition to the above arrangement, there is provided a braking control system for a vehicle, characterized in that the assisting in the braking operation of the driver by the automatic braking means is canceled, based on the operation of returning the brake pedal by the driver.

With the above arrangement, when the driver has returned the brake pedal, the assisting in the braking operation of the driver by the automatic braking means is canceled. Therefore, the assisting in the braking operation can be canceled without providing a sense of incompatibility to the driver and without carrying out a special canceling operation.

In addition to the above arrangement, there is provided a braking control system for a vehicle, characterized in that the automatic braking operation provided by the automatic braking means is canceled, when the brake pedal depressing operation by the driver is not detected.

With the above arrangement, when the brake pedal depressing operation by the driver is not detected, the automatic braking operation provided by the automatic braking means is canceled. Therefore, when the need for carrying out the automatic braking operation is eliminated, the automatic braking operation can be canceled without providing a sense of incompatibility to the driver and without carrying out a special canceling operation. In addition, the automatic braking operation is canceled automatically and hence, it is possible to prevent the driver from overestimating the automatic braking operation.

BRIEF DESCRIPTION OF THE DRAWINGS

FIG. 6 is a graph showing the target deceleration with respect to the stroke speed of a brake pedal.

BEST MODE FOR CARRYING OUT THE INVENTION

A mode for carrying out the present invention will now be described by way of an embodiment with reference to the accompanying drawings.

FIGS. 1 to 6 show an embodiment of the present invention.

Figure 1:
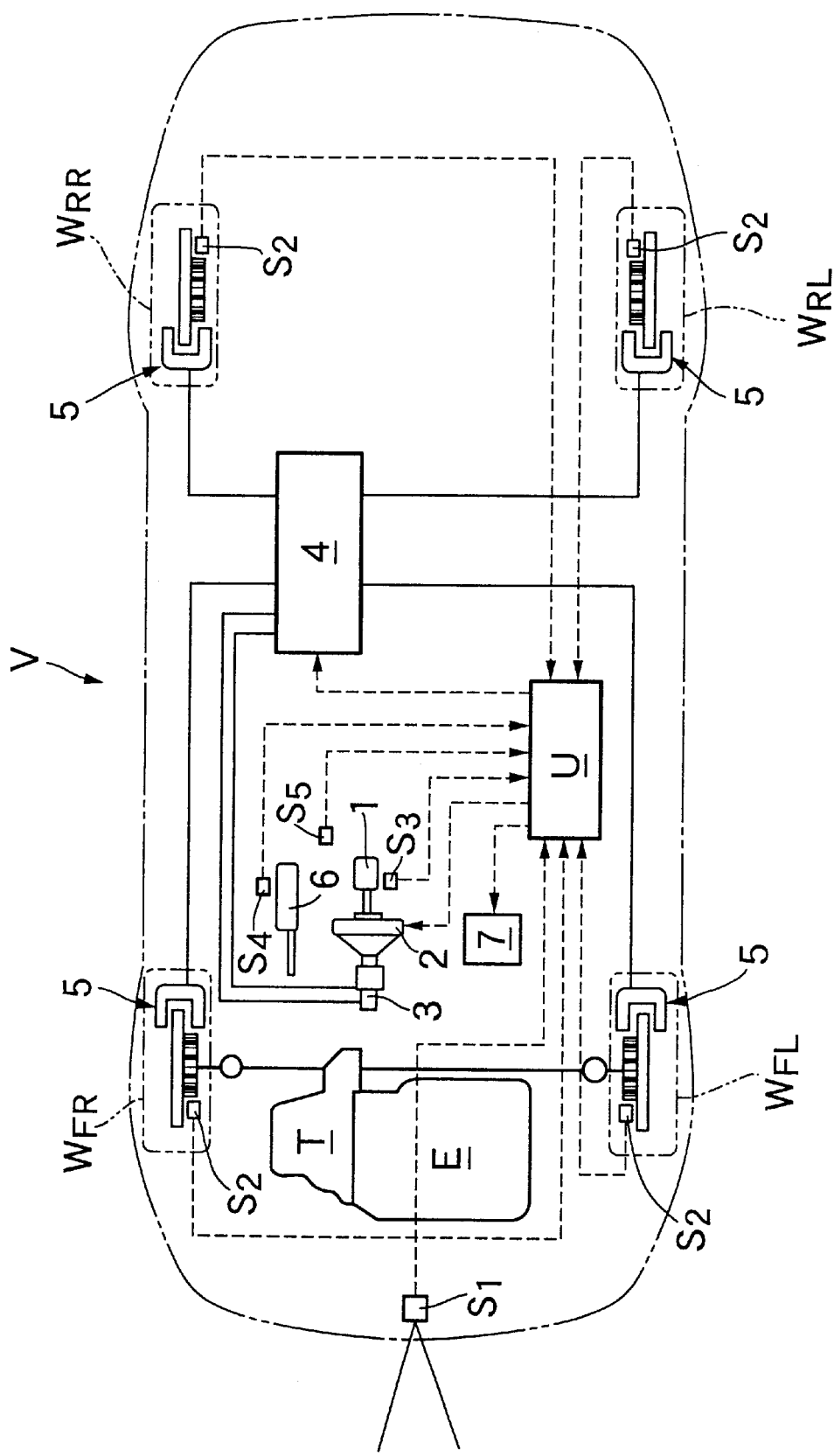
FIG. 1 is an illustration of the entire arrangement of a vehicle having a braking control system mounted thereon.

As shown in FIG. 1, a four-wheel vehicle V provided with a braking control system according to the present invention includes left and right front wheels $W_{FL}$, $W_{FR}$ which are driven wheels to which the driving force from an engine E is transmitted through a transmission T, and left and right rear wheels $W_{RL}$, $W_{RR}$ which are follower wheels. A brake pedal 1 operated by a driver, is connected to a master cylinder 3 through an electronically controlled vacuum booster 2 which is a braking device in the present invention. The electronically controlled vacuum booster 2 mechanically boosts the depressing force on the brake pedal 1 to operate the master cylinder 3, and also operates the master cylinder 3 by means of a signal from an electronic control unit U without recourse to the operation of the brake pedal 1, during an automatic braking operation. An input rod of the electronically controlled vacuum booster 2 is connected to the brake pedal 1 through a lost motion mechanism, so that the brake pedal 1 remains at an initial position, even if the electronically controlled vacuum booster 2 is operated by the signal from the electronic control unit U, whereby the input rod is moved forwards.

The master cylinder 3 is connected to brake calipers 5 mounted on the front wheels $W_{FL}$, $W_{FR}$ and the rear wheels $W_{RL}$, $W_{RR}$, through a pressure regulator 4. The pressure regulator 4 individually controls the hydraulic braking pressures transmitted to the front wheels $W_{RL}$, $W_{FR}$ and the rear wheels $W_{RL}$, $W_{RR}$ by the signal from the electronic control unit U to conduct an antilock brake control for inhibiting the locking of the wheels.

Connected to the electronic control unit U are a radar device $S_1$ for transmitting an electromagnetic wave such as laser beam or millimeter wave forward a vehicle body to detect the relative distance and the relative speed between the vehicle and an object such as a preceding vehicle traveling ahead of the vehicle based on the reflected electromagnetic wave, wheel speed sensors $S_2$ for detecting rotational speeds of the front wheels $W_{FL}$, $W_{FR}$ and the rear wheels $W_{RL}$, $W_{RR}$, respectively, a stroke sensor $S_3$ for detecting the stroke of the brake pedal 1, an accelerator opening degree sensor $S_4$ for detecting the amount of operation of an accelerator pedal 6, and a foot-movement detecting sensor $S_5$ for detecting the speed of movement of the driver's foot toward the brake pedal 1 by use of ultrasonic waves or infrared rays.

The electronic control unit U controls the operations of the electronic control vacuum booster 2 and the pressure regulator 4 based on a signal from the radar device $S_1$ forming an object detecting system of the present invention and signals from the sensors $S_2$ to $S_5$, and also controls the operation of a warning device 7 comprising a speaker.

Figure 2:
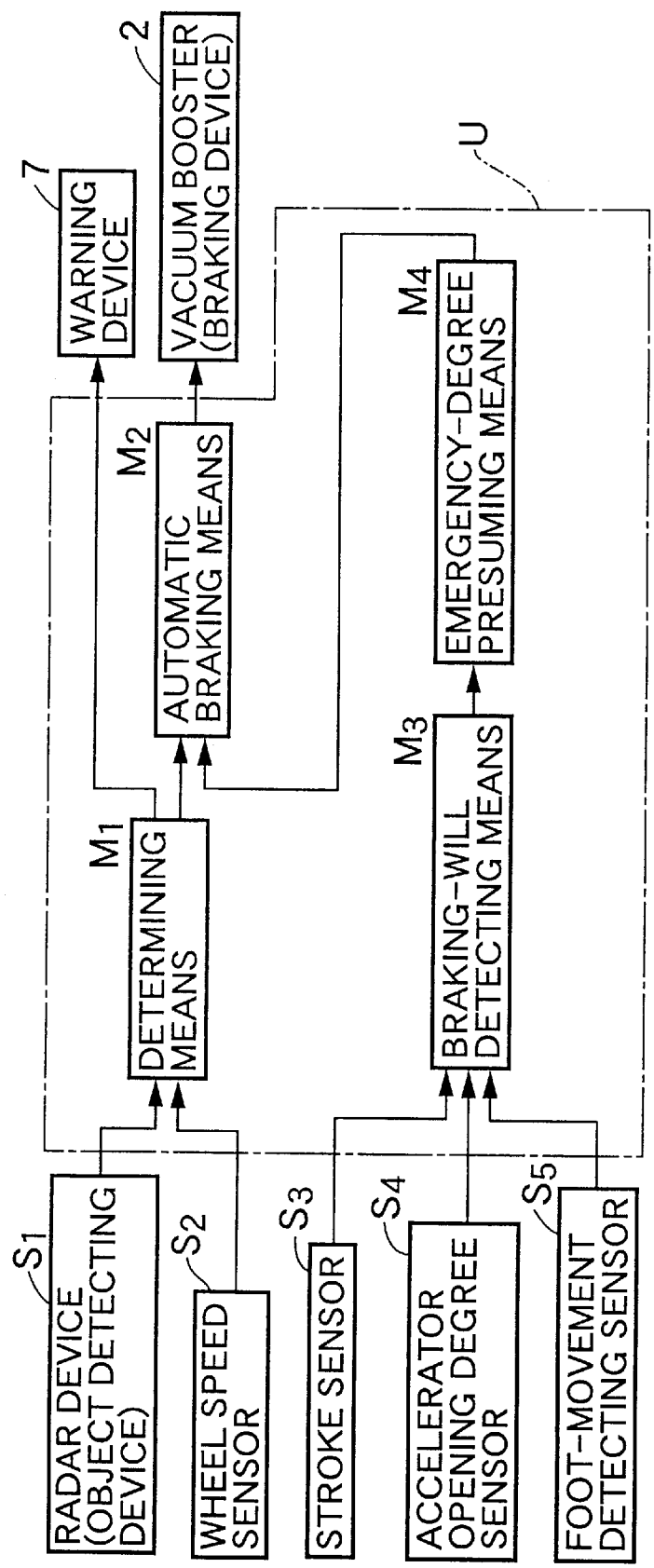
FIG. 2 is a block diagram showing a circuit arrangement of an electronic control unit.

As shown in FIG. 2, the electronic control unit U is provided with a determining means M1, an automatic braking means M2, a braking-will detecting means M3, and an emergency-degree presuming means M4. The determining means M1 determines whether it is necessary to carry out the warning or the automatic braking operation to avoid the contact of the vehicle with an object, based on the relative distance and relative speed between the vehicle and the object detected by the radar device $S_1$, and the vehicle speed and acceleration of the vehicle detected by the wheel speed sensors $S_2$. More specifically, when the relative distance between the vehicle and the object is smaller than a predetermined threshold value, or when the relative speed of the vehicle moving toward the object is higher than the predetermined threshold value, it is determined that there is the high possibility of contact of the vehicle with the object. In this case, the further proper determination can be carried out by correcting the threshold values based on the magnitudes of the vehicle speed and acceleration of the vehicle, considering that it is difficult to avoid the contact of the vehicle with the object by the braking operation or the steering operation, if the vehicle speed and the positive acceleration of the vehicle are high. Further, it is possible to consider an amount of lateral overlapping of the vehicle on the object detected by the radar device $S_1$ and a state of turning movement of the vehicle detected by a yaw rate sensor.

If the determining means M1 determines that there is the possibility that the vehicle will contact with the object, the warning device 7 is operated to press the driver for a spontaneous braking operation by a buzzer sound or voice, and the automatic braking means M2 operates the electronic control vacuum booster 2 to generate the hydraulic braking pressure in the master cylinder 3, thereby operating the brake calipers 5 by such hydraulic braking pressure to carry out the automatic braking operation.

On the other hand, the braking-will detecting means M3 detects whether the driver has a will to carry out the spontaneous braking operation, based on the signal from the stroke sensor $S_3$ for the brake pedal 1. When the stroke sensor $S_3$ detects that the driver has depressed the brake pedal 1, it is determined that the driver has the braking will. Meanwhile, it may be detected whether the driver has a will to carry out the spontaneous braking operation, based on the signal or signals from the accelerator opening degree sensor $S_4$ and/or the foot-movement detecting sensor $S_5$ in addition to the signal from the stroke sensor $S_3$ or in place of the signal from the stroke sensor $S_3$. More specifically, when the accelerator opening degree sensor $S_4$ detects that the driver has released his foot from the accelerator pedal 6 to depress the brake pedal 1, or when the foot-movement detecting sensor $S_5$ detects that the driver has moved his foot toward the brake pedal 1 to depress the brake pedal 1, it can be detected that the driver has the braking will, by collectively taking the signals from the accelerator opening degree sensor $S_4$ and the foot-movement detecting sensor $S_5$ into consideration.

When the braking-will detecting means M3 detects the driver's braking will, the emergency-degree presuming means M4 presumes the degree of emergency in the braking will. Specifically, when the speed of brake pedal 1 depressed by the driver is large, when the speed of accelerator pedal 6 returned by the driver is large, or when the speed of foot moved toward the brake pedal 1 by the driver is large, it is presumed that the degree of emergency in the driver's braking-will is large.

When the automatic braking means M2 operates the electronic control vacuum booster 2 to carry out the automatic braking operation, the braking force for the automatic braking operation provided by the automatic braking means M2 is changed based on the driver's braking will detected by the braking-will detecting means M3 and the degree of emergency in the driver's braking will detected by the emergency-degree presuming means M4, whereby the braking operation of the driver is assisted by the braking force for the automatic braking operation.

The above-described operation will be described in further detail with reference to flow charts in FIGS. 3 and 4.

First, at Step S1, the determining means M1 presumes a degree of risk for the contact of the vehicle with the object based on the outputs from the radar device $S_1$, and the wheel speed sensors $S_2$. If the degree of risk exceeds a warning threshold value at Step S2, the warning device 7 is operated at Step S3 to press the driver for the spontaneous braking operation by a buzzer sound or an artificial voice. If the degree of risk is equal to or smaller than the warning threshold value at Step S2, the operation of the warning device 7 is canceled at Step S4.

Figure 5:
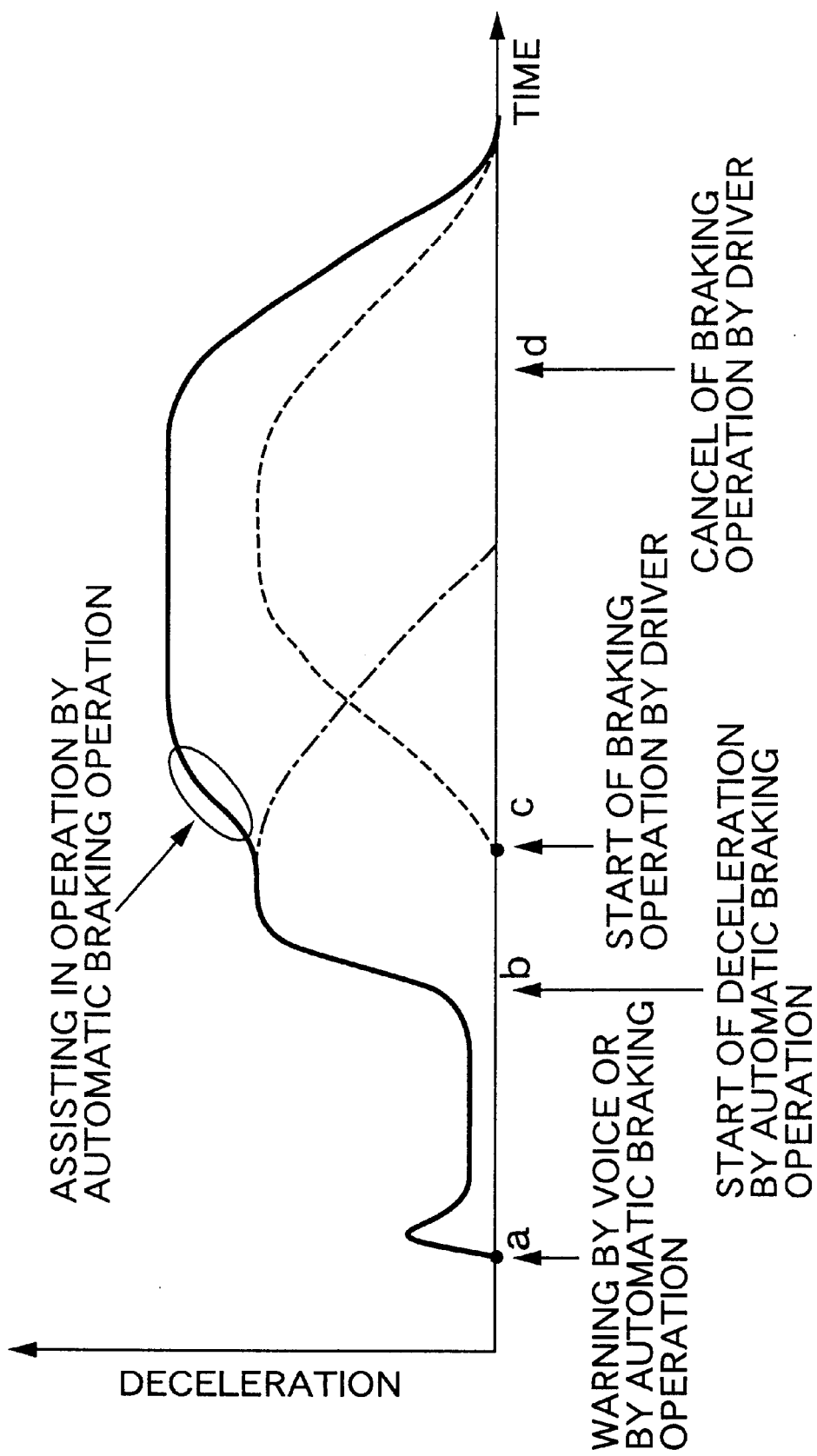
FIG. 5 is a time chart for the deceleration of the vehicle caused by an automatic braking operation.

As can be seen from FIG. 5, the driver can be obliged to feel a deceleration to call an attentiveness by operating the electronic control vacuum booster 2 by a command from the automatic braking means M2 simultaneously with the output of the warning at a time point a to provide the instantaneous rising of the braking force, and then by generating the weak braking force continuously.

At subsequent Step S5, it is determined in the determining means M1 whether the degree of risk exceeds an automatic braking threshold value which is larger than the warning threshold value. If the degree of risk is further increased to exceed the automatic braking threshold value, the processing is advanced to Step S6 at which the automatic braking operation is started. On the other hand, if the degree of risk is decreased to be equal to or smaller than the automatic braking threshold value, it is determined that the need for carrying out the automatic braking operation has been eliminated, proceeding to Step S7 at which an automatic braking mode is finished. After Step S6, control operations different depending on the automatic braking mode or a braking operation assisting mode are carried out. The automatic braking mode is a mode in which the automatic braking operation is carried out when the driver does not carry out the spontaneous braking operation. The braking operation assisting mode is a mode in which the spontaneous braking operation conducted by the driver is assisted by the automatic braking operation.

When it is determined at Step S5 that the automatic braking operation is required to be carried out, it is determined at Steps S6 and S8 whether the automatic braking mode or the braking operation assisting mode has already been set. When neither the automatic braking mode nor the braking operation assisting mode has been set, i.e., when carrying out of the automatic braking operation is required for the first time in the current loop, the processing is advanced to Step S9 at which the automatic braking mode is set. At Step S10, a deceleration of 0.5 G (G is a gravity acceleration) which is a target deceleration in the automatic braking operation is generated by operating the electronic control vacuum booster 2 by the automatic braking means M2 (see a time point b in FIG. 5).

Figure 4:
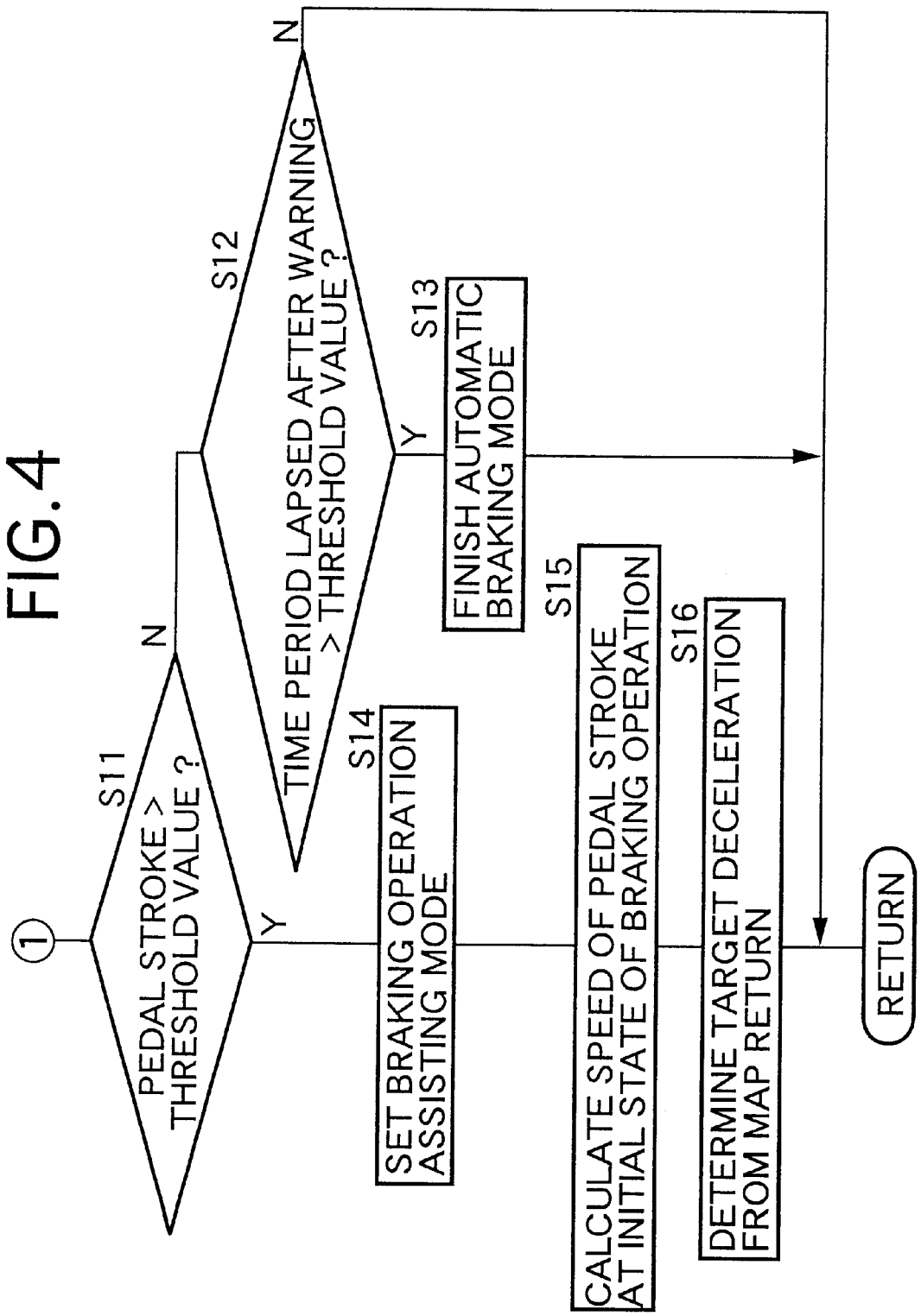
FIG. 4 is a second portion of the flow chart for explaining the operation.

When the automatic braking operation is started in the above manner, the answer at Step S6 is YES in the next loop, proceeding to Step S11 in FIG. 4. At Step S11, it is determined by the braking-will detecting means M3 whether the driver has carried out the spontaneous braking operation. Specifically, it is determined whether the pedal stroke detected by the stroke sensor $S_3$ for the brake pedal 1 exceeds a predetermined threshold value. If the pedal stroke is equal to or smaller than the threshold value for the reason that the spontaneous braking operation has not been carried out by the driver, the processing is advanced to Step S12. When a sufficient period of time (e.g., two seconds) for the driver to carry out the spontaneous braking operation is lapsed at Step S12 after starting of the warning at the time point a in FIG. 5, the automatic braking means M2 discontinues the operation of the electronic control vacuum booster 2 to finish the automatic braking mode at Step S13. As a result, the braking force is gradually decreased from 0.5 G which is the target deceleration in the automatic braking operation to 0 G, as shown by a dashed line in FIG. 5.

In this way, when the driver does not carry out the spontaneous braking operation, even if 2 seconds have been lapsed after starting of the automatic braking operation, it is determined that the need for carrying out the braking operation has been eliminated for any reason, thereby finishing the automatic braking operation. Therefore, the need for carrying out a special finishing operation by the driver is eliminated, whereby the operating burden is alleviated. It is possible to prevent the driver from overestimating the automatic braking operation by limiting the time period of continuation of the automatic braking operation to two seconds.

On the other hand, when the pedal stroke detected by the stroke sensor $S_3$ for the brake pedal 1 exceeds the predetermined threshold value at Step S11, i.e., the braking-will detecting means M3 detects the spontaneous braking operation carried out by the driver, the braking operation assisting mode is set at Step S14 (see a time point c in FIG. 5). When the braking operation assisting mode has been set, the emergency-degree presuming means M4 presumes a degree of emergency for the braking operation, based on a differentiated value of the pedal stroke detected by the stroke sensor $S_3$ for the brake pedal 1, namely a stroke speed at the time when the driver has started the operation of the brake pedal 1, at Step S15. Then, a target deceleration corresponding to such stroke speed is searched based on a map shown in FIG. 6 at Step S16, and the automatic braking means M2 operates the electronic control vacuum booster 2, so that such target deceleration is obtained.

As can be seen from FIG. 6, the target deceleration is set at 0.5 G at a stroke speed of the brake pedal 1 lower than 100 mm/sec. The target deceleration is increased linearly from 0.5 G to 1.0 G in a range of the stroke speed equal to or higher than 100 mm/sec (inclusive) and lower than 200 mm/sec, and is maintained at 1.0 G at a stroke speed equal to or higher than 200 mm/sec. Therefore, when the degree of emergency for the braking operation is low, the braking force of 0.5 G equal to that in the automatic braking operation carried out theretofore is generated. When the degree of emergency for the braking operation is increased, the braking force of 1.0 G which is the maximum value is generated. The deceleration searched based on the map in FIG. 6 is set to have a value larger than a deceleration generated mechanically by the depressing force applied to the brake pedal 1 by the driver (namely, a deceleration generated without electrically operating the electronic control vacuum booster 2). Therefore, the braking operation carried out by the driver is assisted by the automatic braking operation.

In this way, when the driver has carried out the spontaneous braking operation during the automatic braking operation, the electronic control master cylinder 2 is operated to assist in the braking operation, whereby the braking force is generated automatically. Thus, the braking force equal to or larger than the braking force in the automatic braking mode carried out theretofore is generated. Therefore, it is possible to effectively assist in the braking operation of the driver to effectively avoid the contact of the vehicle with the object by the braking operation.

Meanwhile, the detection of the degree of emergency for the braking operation by the emergency-degree presuming means M4 can be carried out based on a speed of the driver's foot released from the accelerator pedal 6 by the driver, or a speed of the driver's foot moved toward the brake pedal 1 by the driver.

Figure 3:
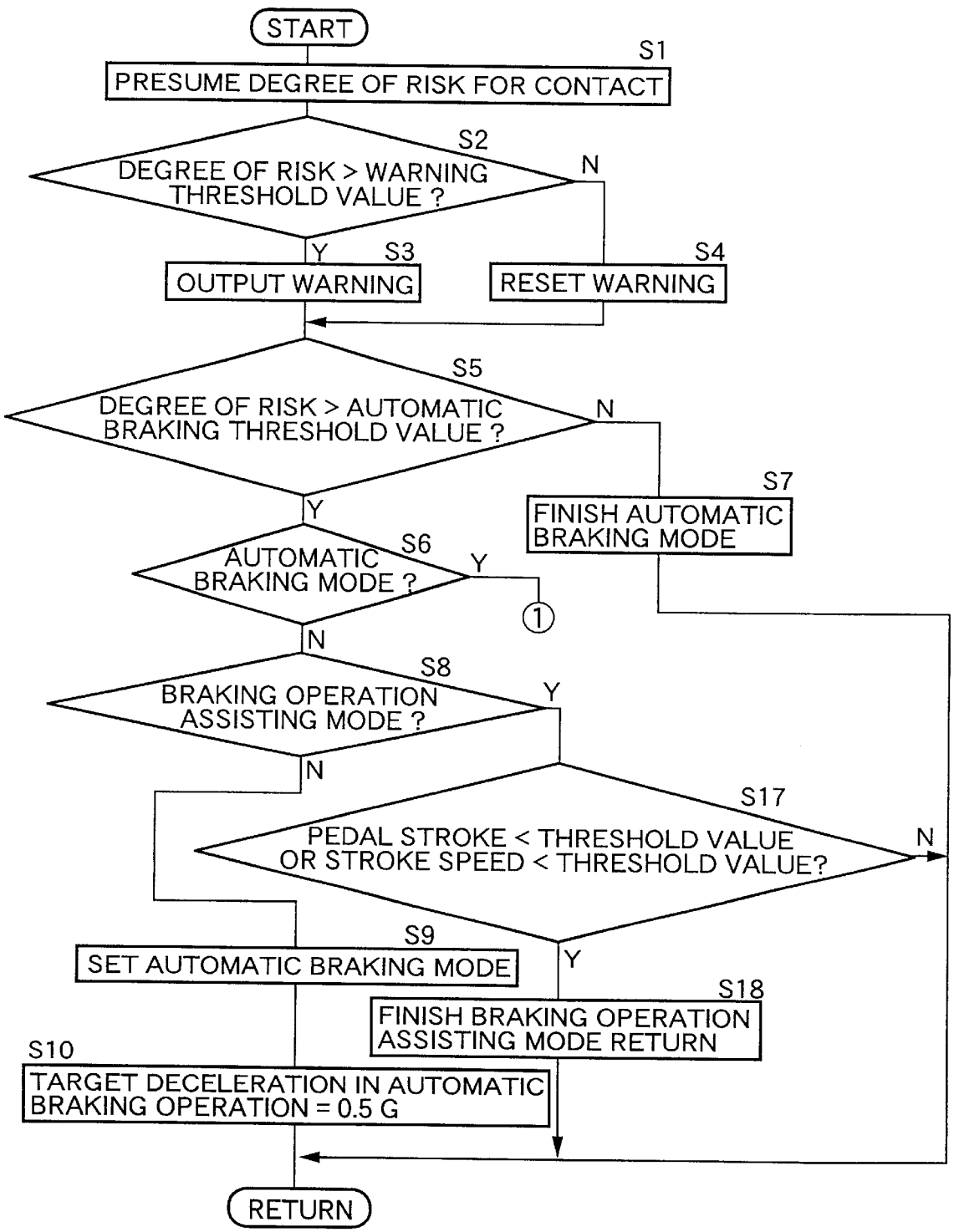
FIG. 3 is a first portion of a flow chart for explaining the operation.

When the braking operation assisting mode has been set in the above-described manner, the answer at Step S8 in the flow chart shown in FIG. 3 is YES, progressing to Step S17. When the brake pedal 1 is returned by the driver, as shown by a broken line at a time point d in FIG. 5, thereby ensuring that the pedal stroke is smaller than the predetermined threshold value, or the stroke speed (the signed direction of returning of the brake pedal 1 is negative) is smaller than the predetermined threshold value (negative value) at Step S17, the braking operation assisting mode is canceled at Step S18 without carrying out a special canceling operation by the driver, whereby the braking force is gradually decreased toward zero. The driver's will is also reflected to the canceling of the automatic braking operation, thereby enabling the braking free from a sense of incompatibility. The canceling of the automatic braking operation can be carried out, even when the vehicle has been stopped.

Although the embodiment of the present invention has been described, it will be understood that various modifications in design may be made without departing from the subject matter of the present invention.

For example, the deceleration of 0.5 G in the automatic braking mode in the embodiment can be changed as desired, but a range of 0.4 G to 0.6 G is preferred. The maximum deceleration of 1.0 G in the braking operation assisting mode in the embodiment can also be changed as desired, but a range of 0.8 G to 1.0 G is preferred.

In addition, the electronic control vacuum booster 2 has been illustrated as a braking device in the embodiment, but the braking device may be a device for generating a hydraulic braking pressure by a hydraulic pump, or an electric brake for braking wheels mechanically by the driving force of a motor.

Further, the operation of depressing the brake pedal 1 can be detected from the hydraulic pressure output from the master cylinder 3, in place of being detected by the stroke sensor $S_3$.

Yet further, the warning device 7 may be a visually indicating means such as a head-up display or a warning lamp.

What is claimed is:

1. A braking control system for a vehicle, comprising
   an object detecting device for detecting an object existing ahead of the vehicle in the direction of movement of the vehicle, a braking device for braking the vehicle, a determining means for determining the possibility of contact of the vehicle with the object from the relative positional relationship between the vehicle and the object, based on a result of the detecting conducted by said object detecting device, and an automatic braking means for operating said braking device based on the result of the determining conducted by said determining means to carry out an automatic braking operation, wherein said braking control system further includes a braking-intention detecting means for detecting a driver's braking intention, so that said automatic braking means assists in the braking operation conducted by the driver, when the driver's braking intention is detected by said braking-intention detecting means during the automatic braking operation conducted by said automatic braking means.

2. A braking control system for a vehicle according to claim 1, wherein said braking-intention detecting means detects the driver's braking intention, based on at least one of the operation of depressing a brake pedal by the driver, the operation of returning an accelerator pedal by the driver and the movement of a foot of the driver toward the brake pedal.

3. A braking control system for a vehicle according to claim 2, wherein said braking control system further includes a warning device for outputting a warning to the driver prior to the start of the automatic braking operation provided by said automatic braking means, and said braking-intention detecting means detects the driver's braking intention, based on at least one of the operation of depressing the brake pedal by the driver, the operation of returning the accelerator pedal by the driver and the movement of the driver's foot toward the brake pedal, within a predetermined period of time after output of the warning by said warning device.

4. A braking control system for a vehicle according to any one of claims 1 to 3, wherein the assisting in the braking operation of the driver by said automatic braking means is to maintain the braking force in the automatic braking operation before detection of the driver's braking intention, or to increase the braking force in said automatic braking operation.

5. A braking control system for a vehicle according to any one of claims 1 to 3, wherein the assisting in the braking operation of the driver by said automatic braking means is to generate a braking force exceeding the braking force corresponding to the braking operation of the driver.

6. A braking control system for a vehicle according to any one of claims 1 to 3 wherein said braking control system further includes an emergency-degree presuming means for presuming the degree of emergency in the driver's braking intention, and as the degree of emergency presumed by said emergency-degree presuming means is higher, said automatic braking means increases the braking force in the automatic braking operation.

7. A braking control system for a vehicle according to claim 6, wherein said emergency-degree presuming means presumes the degree of emergency in the driver's braking intention, based on at least one of the speed of the operation of depressing the brake pedal by the driver, the speed of the operation of returning the accelerator pedal by the driver and the speed of the movement of the driver's foot toward the brake pedal.

8. A braking control system for a vehicle according to any one of claims 1 to 3, wherein the assisting in the braking operation of the driver by said automatic braking means is canceled based on the operation of returning the brake pedal by the driver.

9. A braking control system for a vehicle according to any one of claims 1 to 3 wherein the automatic braking operation provided by said automatic braking means is canceled, when the operation of depressing the brake pedal by the driver is not detected.

* * * * *